United States Patent
Davis et al.

(10) Patent No.: US 10,323,535 B2
(45) Date of Patent: Jun. 18, 2019

(54) BLADE TIP CLEARANCE SYSTEMS

(71) Applicant: United Technologies Corporation, Farmington, CT (US)

(72) Inventors: Timothy M. Davis, Kennebunk, ME (US); Jose R. Paulino, Saco, ME (US); Brian Duguay, Berwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 302 days.

(21) Appl. No.: 15/102,978

(22) PCT Filed: Nov. 19, 2014

(86) PCT No.: PCT/US2014/066304
§ 371 (c)(1),
(2) Date: Jun. 9, 2016

(87) PCT Pub. No.: WO2015/130355
PCT Pub. Date: Sep. 3, 2015

(65) Prior Publication Data
US 2016/0312643 A1 Oct. 27, 2016

Related U.S. Application Data

(60) Provisional application No. 61/914,245, filed on Dec. 10, 2013.

(51) Int. Cl.
*F01D 11/18* (2006.01)
*F01D 5/02* (2006.01)
*F01D 5/12* (2006.01)

(52) U.S. Cl.
CPC ........... *F01D 11/18* (2013.01); *F01D 5/02* (2013.01); *F01D 5/12* (2013.01); *F05D 2220/32* (2013.01);
(Continued)

(58) Field of Classification Search
CPC .................. F01D 11/18; F01D 11/24
See application file for complete search history.

(56) References Cited

U.S. PATENT DOCUMENTS 4,527,385 A * 7/1985 Jumelle ............. F01D 11/18
  415/116
4,565,492 A * 1/1986 Bart ................ F01D 11/18
  415/116

(Continued)

OTHER PUBLICATIONS

Notification of Transmittal of the International Search Report of the International Searching Authority, or the Declaration; PCT/US2014/066304; dated Aug. 26, 2015. 3 pages.
(Continued)

*Primary Examiner* — Justin D Seabe
(74) *Attorney, Agent, or Firm* — Cantor Colburn LLP

(57) ABSTRACT

A blade tip clearance system includes first and second control rings. The first control ring has a first coefficient of thermal expansion (CTE) and a first thermal response rate. The second control ring is located radially outward of and operatively connected to the first control ring and has a second CTE that is different from the first CTE and a second thermal response rate that is different from the first thermal response rate. Thermal expansion and contraction of the first and the second control rings controls a radial position of the blade tip clearance system relative to a rotating blade component.

15 Claims, 5 Drawing Sheets

(52) U.S. Cl.
CPC .............. *F05D 2260/22141* (2013.01); *F05D 2300/5021* (2013.01); *Y02T 50/676* (2013.01)

(56) References Cited

U.S. PATENT DOCUMENTS

| | | |
|---|---|---|
| 5,092,737 A | 3/1992 | Lau |
| 5,593,278 A | 1/1997 | Jourdain et al. |
| 5,639,210 A * | 6/1997 | Carpenter ................ F01D 11/18 415/135 |
| 2003/0049121 A1 | 3/2003 | Dierksmeier et al. |
| 2005/0265827 A1 | 12/2005 | Wilson, Jr. |
| 2010/0031671 A1 * | 2/2010 | Chehab .................. F01D 11/18 60/796 |
| 2012/0275898 A1 | 11/2012 | McCaffrey et al. |

OTHER PUBLICATIONS

Notification of Transmittal of the Written Opinion of the International Searching Authority, or the Declaration; PCT/US2014/066304; dated Aug. 26, 2015. 10 pages.

Supplementary European Search Report Issued in EP Application No. 14883657.0, dated Aug. 7, 2017, 6 Pages.

\* cited by examiner

BLADE TIP CLEARANCE SYSTEMS

RELATED APPLICATIONS

This application is National Phase Application of Patent Application PCT/2014/066304 filed of Nov. 19, 2014, which claims the benefit of and priority to U.S. Provisional Patent Application No. 61/914,245, filed Dec. 10, 2013, the contents each of which are incorporated herein by reference in their entirety.

STATEMENT REGARDING FEDERALLY SPONSORED RESEARCH OR DEVELOPMENT

This invention was made with government support under contract number FA8650-09-D-2923 0021 awarded by the United States Air Force. The government has certain rights in the invention.

BACKGROUND OF THE INVENTION

1. Field of the Invention

The present disclosure relates to seals, and more particularly to seals for turbomachinery, such as for example seals between a case and rotor turbine blades in a gas turbine engine.

2. Description of Related Art

Leakage of flow-path air may occur in turbomachinery between the tips of a rotating blade structure and the outer static structure. This leakage has a negative effect on performance, efficiency, fuel burn, and component life. Turbomachinery with a wide operating range, such as an aircraft gas turbine engine, conventionally requires large tip clearances due to the mismatch in thermal responses between the rotating structure and the static structure. A static structure with a rapid thermal response rate will experience significant closure to the rotating structure during rapid decelerations. Conversely, a static structure with a slow thermal response will experience significant closure to the rotating structure during rapid accelerations. As a result, both configurations require large tip clearances throughout the operating range. In particular, sudden excursions during aircraft missions drive the need for larger tip clearances at idle, take off, and cruise.

SUMMARY OF THE INVENTION

A blade tip clearance system includes an inner control ring and an outer control ring located radially outward of and operatively connected to the inner control ring. The inner control ring has a first coefficient of thermal expansion and a first thermal response rate. The outer control ring has a second coefficient of thermal expansion that is different from the first coefficient of thermal expansion and a second thermal response rate that is different from the first thermal response rate. Thermal expansion and contraction of the inner and the outer control rings control a radial position of the blade outer air seal (BOAS) relative to a rotating blade component radially inward of the BOAS for at least two conditions of thermal loading.

In certain embodiments, the coefficient of thermal expansion of the inner control ring is lower than that of the outer control ring. In certain embodiments, the rate of thermal response of the inner control ring is higher than that of the outer control ring. The inner control ring can be a hollow structure with through holes to allow airflow therethrough, and can also include interior fins to increase heat exchange therethrough. The outer control ring can be a full-hoop continuous ring. In certain embodiments, the system can include seals forward and aft of the outer control ring.

In accordance with certain embodiments, a carrier is included to radially center the inner and the outer control rings. Flat feather seals can be included at the walls of the carrier surrounding the outer control ring to thermally isolate the outer control ring. The outer control ring can be a segmented ring with a split at a circumferential location configured to minimize radial gaps between the outer control ring and the carrier. The carrier can be a segmented structure with a forward section and an aft section. A support can be included to mount the carrier to a case. The support can include a support spline slot and the carrier can include a carrier spline tab slidably engaged in the support spline slot. The inner control ring and/or outer control ring can include a spline tab that is also slidably engaged to the support spline slot.

The blade tip clearance system can include an air seal component, e.g., a BOAS, operatively connected to and radially inward of the inner control ring to seal secondary flow air from gas path air while restricting blade tip clearance and thereby restricting leakage of gas path air over the outboard tips of blades. In certain embodiments, a spring may be interposed between the inner and/or outer control rings and the carrier.

A gas turbine engine includes a rotating structure with a plurality of rotating blades with radially outward tips, and a blade tip clearance system as described above located adjacent to the radially outward tips. The blade tip clearance system also includes an external case including at least one support that projects radially inward. A carrier is engaged to at least one support. A blade outer air seal is connected to the carrier and includes a radially inward seal face adjacent to the radially outward tips of the rotating blades. An inner control ring and an outer control ring, as described above, are radially centered with respect to the carrier and/or splines. Thermal expansion and contraction of the inner and the outer control rings causes a specific clearance between the radially inward seal face of the blade outer air seal and the radially outward tips of the rotating blades given the known expansion and contraction of the blade tips caused by centrifugal loads and thermal response of the rotating blade and disk. The outer control ring can be separated from the inner control ring by a portion of the carrier.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
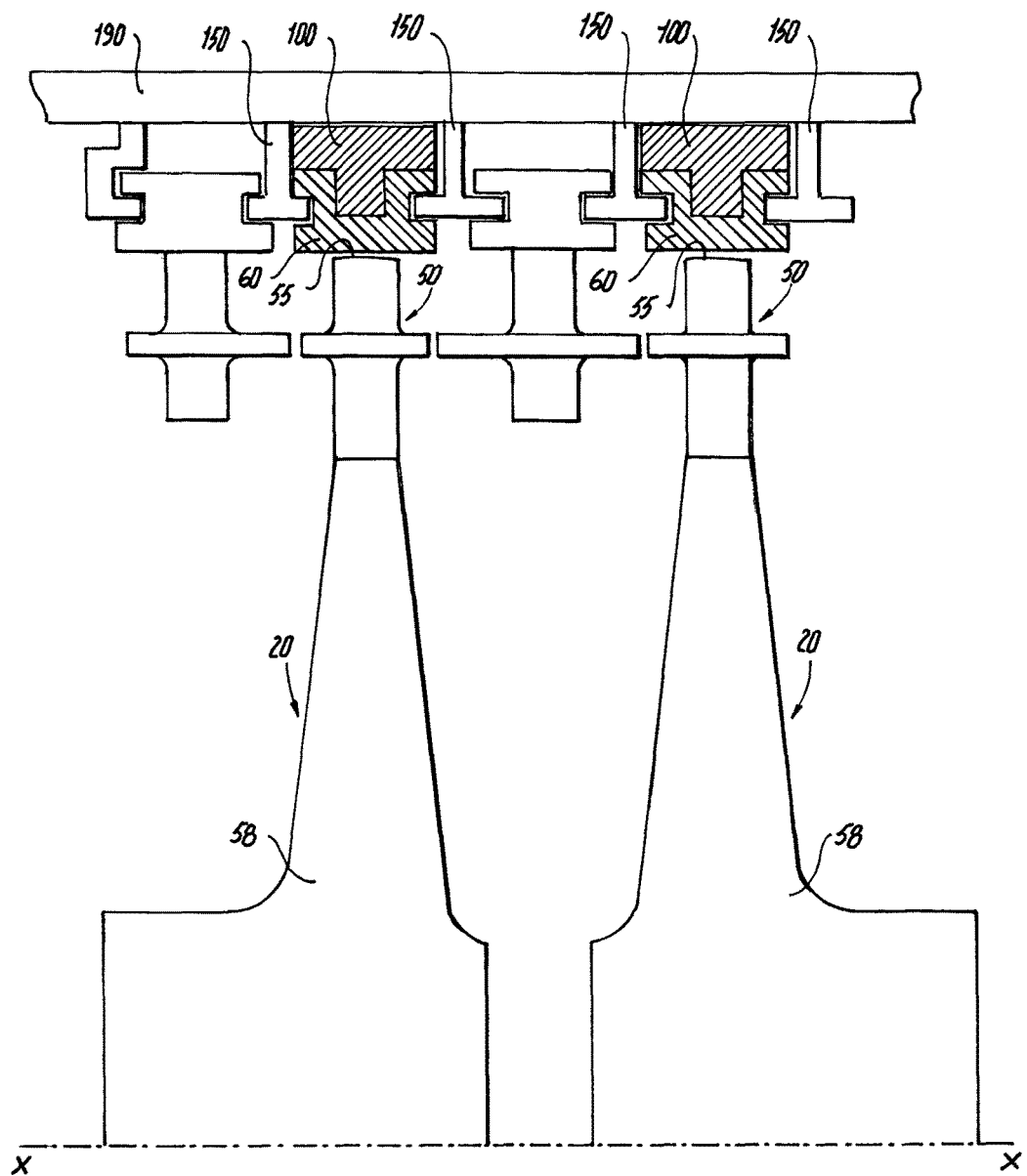
FIG. 1 is a schematic cross-sectional side elevation view depicting the location of the blade tip clearance system within a gas turbine engine in accordance with an embodiment.

Reference will now be made to the drawings wherein like reference numerals identify similar structural features or aspects of the subject disclosure. For purposes of explanation and illustration, and not limitation, a partial view of an exemplary embodiment of the blade tip clearance system is depicted in FIG. 2 and is designated generally by reference character 100. Other embodiments of blade tip clearance systems in accordance with various embodiments, or aspects thereof, are provided in FIGS. 1 and 3-4, as will be described. The systems and methods described herein can be used to provide improved tip clearance control between the rotating blade tip and static blade outer air seal at various operating conditions experienced in gas turbine engines.

Various embodiments of the blade tip clearance system enable thermal responses of the rotating and static structures to be more closely matched at multiple operating conditions, including transients. Matching the thermal responses of the rotating and static structures over multiple conditions allows for tighter clearances between rotating blade tips and an outer flowpath structure and therefore provides improved performance throughout an operational envelope. Thermal matching is achieved at different flight points and throttle excursions using two rings that alternately control the radial position of a blade outer air seal (BOAS) carrier by pulling or loading radially outward on segmented carriers.

Figure 2:
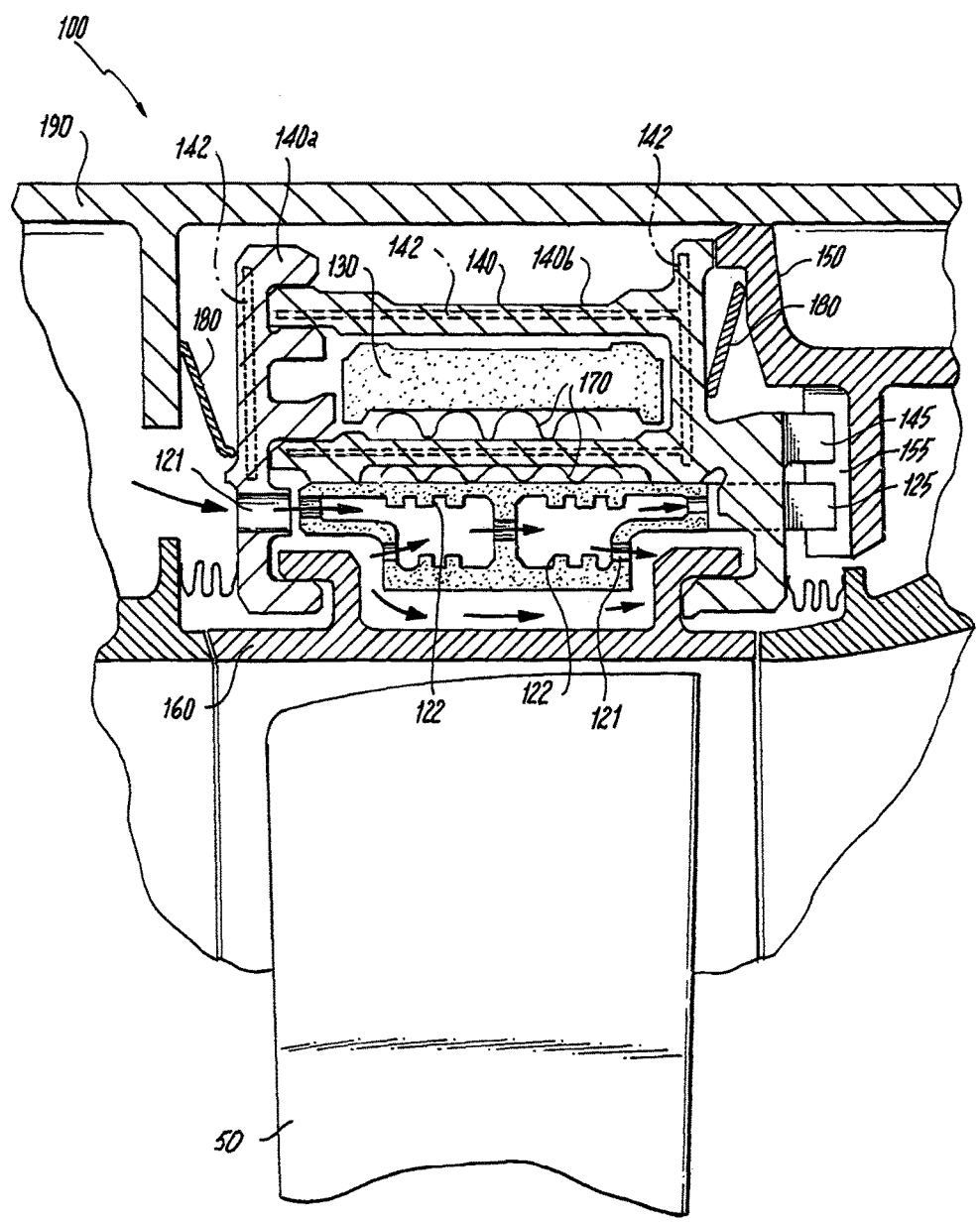
FIG. 2 is a cross-sectional elevation view of a blade tip clearance system depicting the inner and outer control rings centered on the carrier, according to an embodiment.

FIG. 1 schematically illustrates a cross-sectional side elevation view depicting the location of the blade tip clearance system 100, according to an embodiment. The gas turbine engine includes a rotating structure 20 with a plurality of rotating blades 50 attached to a disk 58. Each of the plurality of rotating blades 50 includes a radially outward tip 55. The blade tip clearance system 100 is located outboard of the radially outward tip 55. An external case 190 surrounds the rotating structure 20 and includes supports 150 that project radially inward. The supports 150 are in communication with a blade outer air seal carrier 60. The blade outer air seal carrier 60 includes an air seal component, or BOAS, that seals or restricts axially-flowing gaspath air passing outboard of the blade tips 55 of the rotating structure 20. Thermal expansion and contraction of the blade tip clearance system 100 causes controlled clearances between the blade outer air seal and the radially outward tips 55 of the rotating blades 50 and occurs independently of thermal response and radial positioning of the external case 190.

As shown in FIG. 2, the blade tip clearance system 100 includes an inner control ring 120 and an outer control ring 130 located radially outward of and centered relative to the inner control ring 120. The inner control ring 120 has a first coefficient of thermal expansion (CTE) and a first thermal response rate. The outer control ring 130 has a second CTE that is different from the first CTE and a second thermal response rate that is different from the first thermal response rate. Thermal expansion and contraction of the inner control ring 120 and the outer control ring 130 control a radial position of the blade tip clearance system 100 relative to a rotating blade component 50 radially inward of the blade tip clearance system 100, for at least two conditions of thermal loading.

A carrier 140 can be used to radially center the inner control ring 120 and the outer control ring 130 in place of control ring 120 and/or control ring 130 having radial spline engagements with the support 150. The inner control ring 120 and outer control ring 130 are held concentric to an engine centerline when loaded radially against the carrier 140, due to a nested, arc-within-an-arc interface between the control rings 120, 130 and the carrier 140 in combination with a splined engagement 155 in the carrier 140. The carrier 140 as shown in FIG. 2 is a segmented structure with a forward section 140a and an aft section 140b. A support 150 centers the carrier 140 relative to a case 190. Internal springs 170 are provided for additional centering. As shown in FIG. 2, the internal springs 170 are interposed between the inner and outer control rings 120, 130 and the carrier 140.

As shown in FIG. 2, the support 150 includes a support spline slot 155 and the carrier 140 includes a carrier spline tab 145 slidably engaged in the support spline slot 155. FIG. 2 also shows a spline tab 125 included on the inner control ring 120 and slidably engaged in the support spline slot 155 for additional centering between the inner control ring 120 and the engine centerline. Similarly, a spline feature on the outer control ring 130 can be included for additional centering between the outer control ring 130 and the engine centerline.

A blade outer air seal 160 is operatively in communication with and radially inward of the inner control ring 120 to seal secondary flow air from gaspath air while restricting blade tip clearance and thereby restricting leakage of gaspath air over the outboard tips 55 of the rotating blade component 50. Both inner and outer control rings 120, 130 are configured to be sufficiently stiff to remain generally round or curved while imparting relatively high radial loads necessary to lift the blade outer air seal 160. Materials for the inner and outer control rings 120, 130 can be selected with specific coefficients of thermal expansion and specific cold-build radial gaps between the inner and outer control rings 120, 130 and carrier 140 in order to optimize the timing and sequence for which each control ring imparts loads to the carrier. In an embodiment, the CTE of the inner control ring 120 may be lower than that of the outer control ring 130 and the rate of thermal response of the inner control ring 120 may be higher than that of the outer control ring 130.

Figure 3:
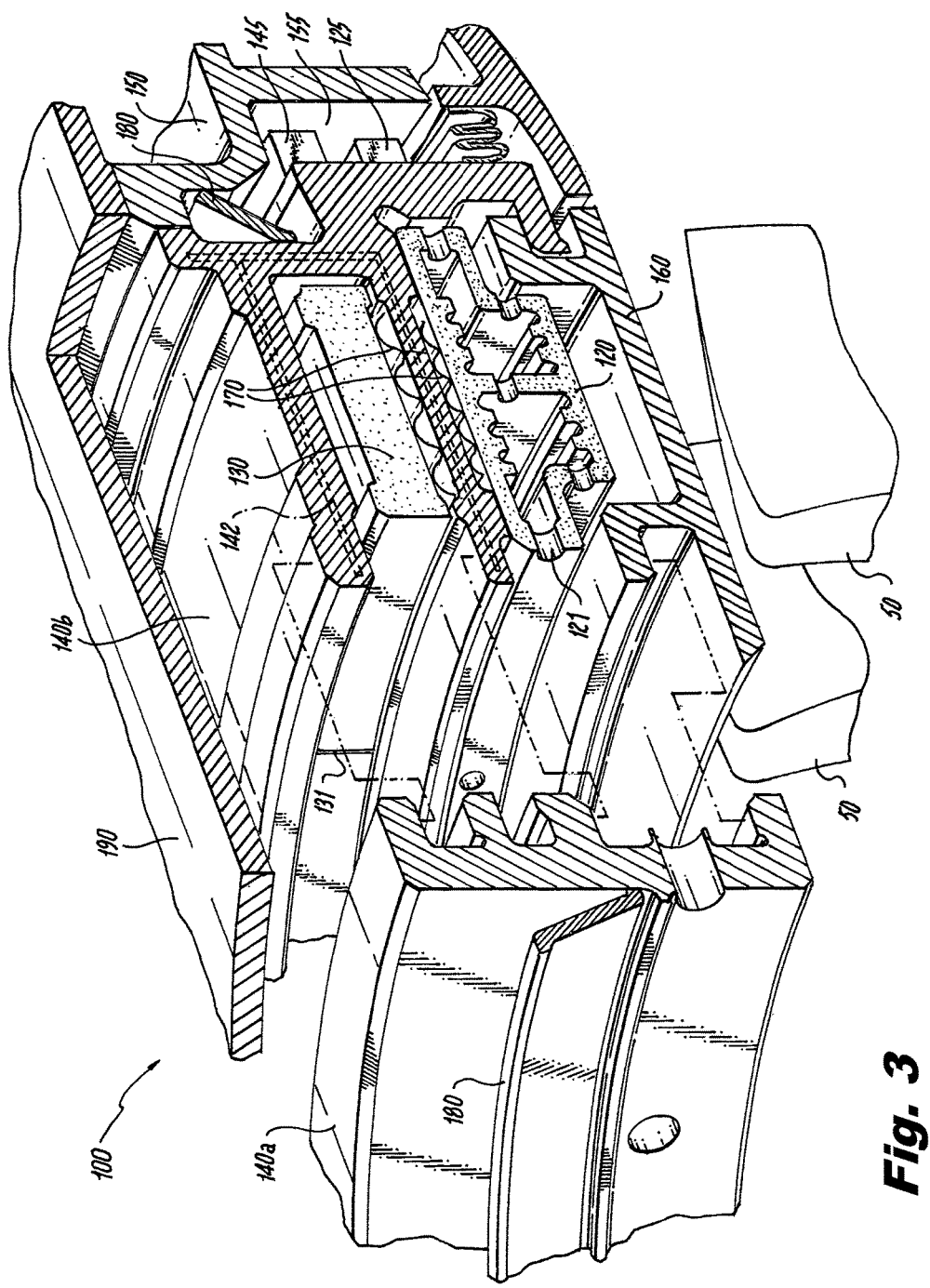
FIG. 3 is a cutaway perspective view of the blade tip clearance system of FIG. 2, according to an embodiment.

The inner control ring 120 can be configured to respond quickly during rapid acceleration and deceleration throttle excursions by geometric features, thermal conditioning, and/or rate of change of CTE. For example, the inner control ring 120 can achieve a rapid thermal response by reducing the mass to surface area ratio, increasing the convective heat transfer coefficient over its entire surface area, and/or selecting a material with a relatively steep CTE curve. As shown in FIGS. 2 and 3, and according to various embodiments, the geometric features of the inner control ring 120 can include a hollow, joined two-piece structure with through-holes 121 to actively channel secondary flow air that can also be used as cooling flow for the blade outer air seal 160, and protruding fins 122 along the interior surface to augment heat exchange across the inner control ring 120.

In an embodiment, the outer control ring 130 can have a much slower thermal response by configuring it to have certain geometric features, thermal isolation, and/or slope of CTE curve. The outer control ring 130 may be thermally isolated by radially distancing it from cooling flow near the blade outer air seal 160 and utilizing full-ring seals 180 forward and aft of the carrier 140 and flat feather seals 142 in the carrier 140 surrounding the outer control ring 130. The outer control ring 130 can be a full-hoop continuous ring, with a sizeable radial gap to the carrier 140 in a cold assembled condition, or as shown in the cross-sectional end elevation view of FIG. 3, the outer control ring 130 can be a hoop split ring with a split and circumferential gap 131 configured to minimize radial gaps between the outer control ring 130 and the carrier 140. Gap 131 is sized to cause the two ends to touch at the desired flight condition, in much the same way as the radial gap 134 (identified in FIGS. 4A and 4B) is sized if a continuous-hoop outer control ring is used. Sufficient alignment at the split location is provided by a flat edge at both ends of the split and a close radial fit between outer control ring 130 and the carrier 140. However, depending on the loading condition of a particular application, a nested interface at gap 131, e.g. a V-in-a-V or tongue-and-groove configuration, may be beneficial.

Figure 4A:
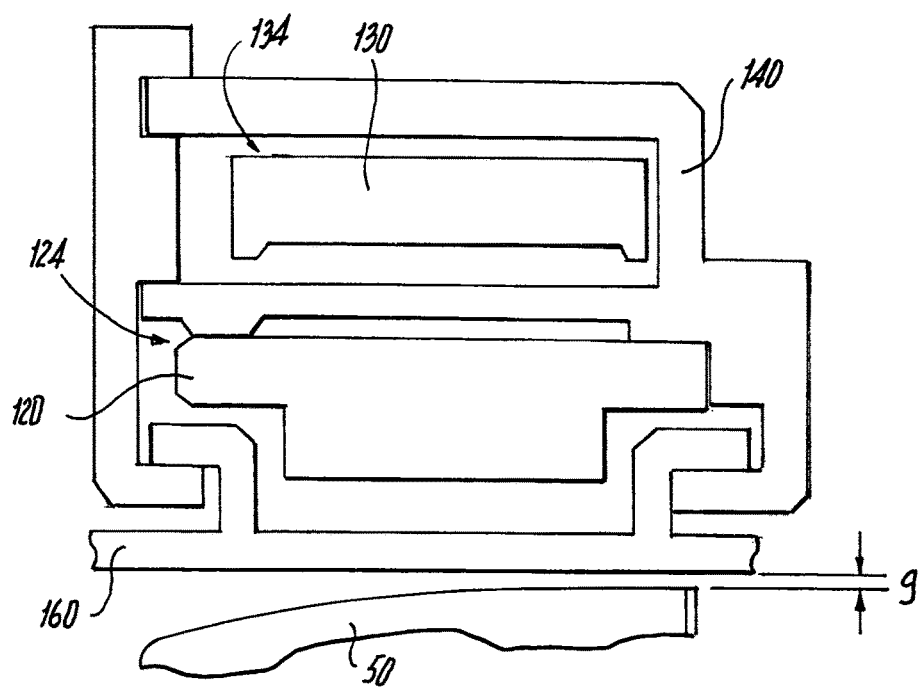
FIGS. 4A-4D are cross-sectional elevation views of the blade tip clearance system for idle, snap acceleration, cruise/steady state/hot reburst, and snap deceleration flight conditions, respectively, according to various embodiments.
Figure 4B:
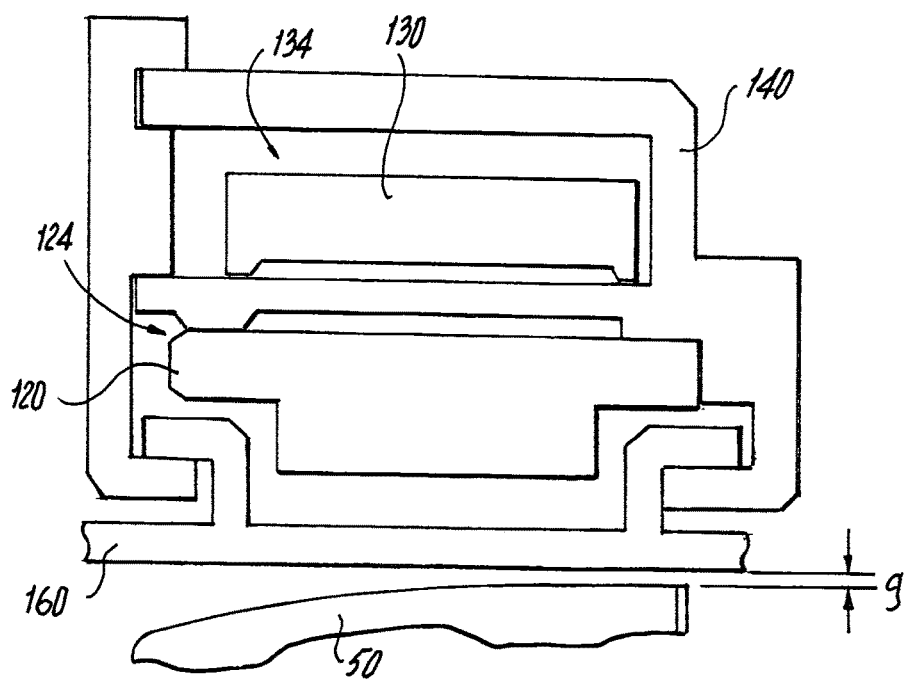
Figure 4C:
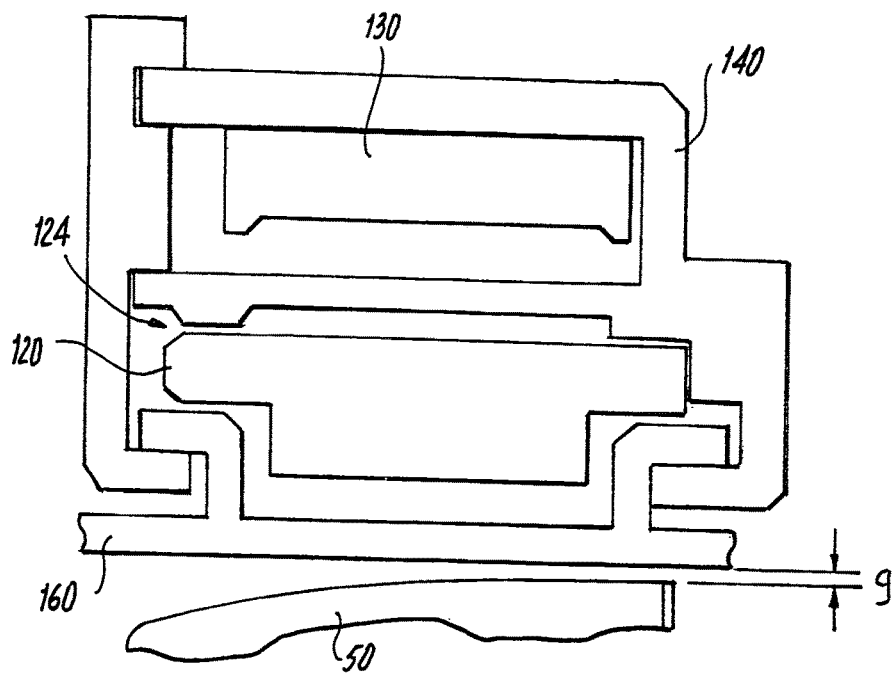
Figure 4D:
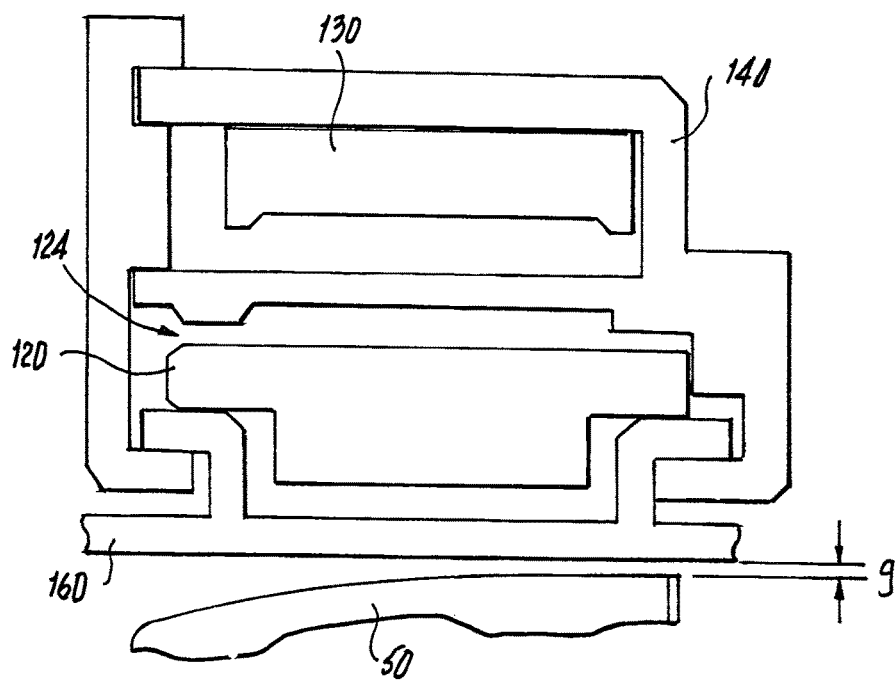

When heated, the circumferences of the rings grow, moving them outboard as shown in FIGS. 4A-4D. The outboard movement of the rings will sufficiently closely match the outward growth of the rotating blades 50, such that a substantially minimized gap g is maintained over a range of operating conditions. The following flight sequence provides an illustration for the operation of a blade tip clearance system in accordance with various embodiments. First, at idle the carrier 140 is loaded against the inner control ring 120, with a small gap present between the carrier 140 and the outer control ring 130, as shown by the outer control ring gap 134 in FIG. 4A. Next, a rapid throttle snap acceleration causes the thermally responsive and low-CTE inner control ring 120 to grow out quickly, close down on gap 124, and quickly pull the carrier 140 and blade outer air seal 160 outboard with it at a rate that sufficiently closely matches the sudden and rapid growth rate of the blade 50 caused by sudden thermal response and centrifugal loading of the blade 50, as shown in FIG. 4B. As the high-CTE, slow thermal-responding outer control ring 130 slowly heats up it closes down radially on the gap 134 with the carrier 140 until it contacts and begins to lift the carrier 140 off of the inner control ring 120 at a desirable or beneficial point as a steady state operating condition is approached, as shown in FIG. 4C. The outer control ring 130 then continues to heat up slowly, pulling the carrier 140 and blade outer air seal 160 radially outward at a rate sufficiently similar to a slow-responding rotor disk. When a snap deceleration throttle excursion occurs, the outer control ring 130 responds slowly so that the blade outer air seal 160 remains in an outward position, as shown in FIG. 4D. Finally, if a snap re-acceleration occurs almost immediately following the snap deceleration, the sudden extreme outboard position of the rotor 50 is more closely matched by the outboard position of the blade outer air seal 160, such that excessive blade tip clearance is not necessary at cruise in order to prevent a heavy rub at this re-acceleration condition.

The result of the concept embodiments is a reduction in tip clearance at multiple flight conditions which benefits engine performance, efficiency, fuel burn, and component life. Moreover, blade tip clearance system 100 may be used on compressor or turbine rotor blades and, in other embodiments, the geometries and thermal properties of the inner and outer control rings can be reversed.

The methods and systems as described above and shown in the drawings, can provide for a blade tip clearance system with superior properties including reduced blade tip clearance over a flight envelope. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A blade tip clearance system comprising:
   a first control ring having a first coefficient of thermal expansion and a first thermal response rate;
   a second control ring located radially outward of and operatively connected to the first control ring, the second control ring having a second coefficient of thermal expansion that is different from the first coefficient of thermal expansion and a second thermal response rate that is different from the first thermal response rate;
   a carrier that radially centers the first and the second control rings; and
   a support connected to the carrier to center the carrier relative to the case
   wherein thermal expansion and contraction of the first and the second control rings are configured to control a radial position of the blade tip clearance system relative to a rotating blade component;
   wherein the support comprises a support spline slot, the carrier comprises a carrier spline tab, and the support spline slot is slidably engaged to the carrier spline tab; and
   wherein the first control ring comprises a spline tab, and the support spline slot is slidably engaged to the spline tab of the first control ring.

2. A blade tip clearance system as recited in claim 1, wherein the coefficient of thermal expansion of the first control ring is lower than that of the second control ring.

3. A blade tip clearance system as recited in claim 2, wherein the rate of thermal response of the first control ring is higher than that of the second control ring.

4. A blade tip clearance system as recited in claim 3, wherein the first control ring is a hollow structure including through holes to allow airflow therethrough.

5. A blade tip clearance system as recited in claim 4, wherein the first control ring includes interior fins to increase heat exchanger therethrough.

6. A blade tip clearance system as recited in claim 3, wherein the second control ring is a full-hoop continuous ring.

7. A blade tip clearance system as recited in claim 1, further comprising seals forward and aft of the second control ring.

8. A blade tip clearance system as recited in claim 1, further comprising flat feather seals at least one wall of the carrier surrounding the second control ring to thermally isolate the second control ring.

9. A blade tip clearance system as recited in claim 1, wherein the second control ring is a segmented ring with a split at a circumferential location configured to minimize radial gaps between the second control ring and the carrier.

10. A blade tip clearance system as recited in claim 1, wherein the carrier is a segmented structure with a forward and an aft section.

11. A blade tip clearance system as recited in claim 1, further comprising a blade outer air seal operatively connected to and radially inward of the first control ring that seals secondary flow air from the rotating blade component and forms an outer shroud for the rotating blade component.

12. A blade tip clearance system as recited in claim 1, further comprising at least one spring interposed between the first and the second control rings.

13. A blade tip clearance system comprising:
a first control ring disposed in a case and having a first coefficient of thermal expansion and a first thermal response rate;
a second control ring located radially outward of and operatively connected to the first control ring, the second control ring having a second coefficient of thermal expansion that is different from the first coefficient of thermal expansion and a second thermal response rate that is different from the first thermal response rate;
a carrier that radially centers the first and the second control rings; and
a support connected to the carrier to center the carrier relative to the case;
wherein thermal expansion and contraction of the first and the second control rings are configured to control a radial position of the blade tip clearance system relative to a rotating blade component;
wherein the support comprises a support spline slot, the carrier comprises a carrier spline tab, and the support spline slot is slidably engaged to the carrier spline tab; and
wherein the second control ring comprises a spline tab, and the support spline slot is slidably engaged to the spline tab of the second control ring.

14. A gas turbine engine comprising:
a rotating structure including a plurality of rotating blades with radially outward tips;
a blade tip clearance system located in a case adjacent to the radially outward tips comprising:
a carrier;
a blade outer air seal in communication with the carrier, the blade outer air seal including a radially inward seal face adjacent to the radially outward tips of the rotating blades;
an inner control ring configured to be radially centered with respect to the carrier, the inner control ring having a first coefficient of thermal expansion and a first thermal response rate;
an outer control ring configured to be radially centered with respect to the carrier, the outer control ring having a second coefficient of thermal expansion and a second thermal response rate; and
a support connected to the carrier to center the carrier relative to the case;
wherein thermal expansion and contraction of the inner and the outer control rings maintains a clearance between the radially inward seal face of the blade outer air seal and the radially outward tips of the rotating blades;
wherein both the inner control ring and the outer control ring are radially translatable relative to the carrier during operation of the blade tip clearance system;
wherein the support comprises a support spline slot, the carrier comprises a carrier spline tab, and the support spline slot is slidably engaged to the carrier spline tab; and
wherein the outer control ring comprises a spline tab, and the support spline slot is slidably engaged to the spline tab of the outer control ring.

15. A gas turbine engine as recited in claim 14, wherein the outer control ring is separated from the inner control ring by a portion of the carrier.

* * * * *